(12) United States Patent
Bubernak

(10) Patent No.: US 11,624,190 B2
(45) Date of Patent: Apr. 11, 2023

(54) TRACK SYSTEM FOR ARCHITECTURAL STRETCH-FABRIC APPLICATIONS

(71) Applicant: FABRI TRAK SYSTEMS, INC., Mount Laurel, NJ (US)

(72) Inventor: John Bubernak, Murrells Inlet, SC (US)

(73) Assignee: FABRI TRAK SYSTEMS, INC., Mount Laurel, NJ (US)

( * ) Notice: Subject to any disclaimer, the term of this patent is extended or adjusted under 35 U.S.C. 154(b) by 501 days.

(21) Appl. No.: 16/731,884

(22) Filed: Dec. 31, 2019

(65) Prior Publication Data

US 2021/0032871 A1 Feb. 4, 2021

Related U.S. Application Data

(60) Provisional application No. 62/882,098, filed on Aug. 2, 2019.

(51) Int. Cl.
*E04F 13/00* (2006.01)

(52) U.S. Cl.
CPC .................... *E04F 13/005* (2013.01)

(58) Field of Classification Search
CPC ... E04F 13/002; E04F 13/005; E04F 13/0814; E04B 9/02; E04B 9/303; E04B 2009/0492
USPC ......................................................... 52/222
See application file for complete search history.

(56) References Cited

U.S. PATENT DOCUMENTS

| | | |
|---|---|---|
| 3,099,058 A | 7/1963 | Pettingell |
| 3,371,702 A | 3/1968 | Keegan et al. |
| 3,783,931 A | 1/1974 | Assael |
| 3,822,734 A | 7/1974 | Tombu |
| 3,833,046 A | 9/1974 | Tombu |
| 3,848,380 A | 11/1974 | Assael |
| 3,982,307 A | 9/1976 | Smith et al. |
| 4,018,260 A | 4/1977 | Baslow |
| 4,197,686 A | 4/1980 | Baslow |
| 4,403,642 A | 9/1983 | Morris |

(Continued)

OTHER PUBLICATIONS

*1/2" Square Edge System*, Novawall, 3 pages, [online], [retrieved from the Internet Feb. 4, 2020]<URL: https://novawall.com/detail/12-square/>.

(Continued)

*Primary Examiner* — Brian E Glessner
*Assistant Examiner* — James J Buckle, Jr.
(74) *Attorney, Agent, or Firm* — Alston & Bird LLP

(57) ABSTRACT

A fabric housing, a method of installing a fabric housing, and a method of manufacturing a fabric housing are provided. The fabric housing for stretching fabric on walls or ceilings includes a first exterior wall. The fabric housing also includes a second exterior wall. The fabric housing further includes a tensioning leg configured to tightly abut one of the first exterior wall or second exterior wall. The tensioning leg is configured to grip a fabric between the tensioning leg and the one of the first exterior wall or second exterior wall. The fabric housing still further includes a pair of opposing jaws configured to secure the fabric. The pair of opposing jaws are disposed along one of the first exterior wall or the second exterior wall. A corresponding method of manufacturing a fabric housing and installing a fabric housing are provided herein.

21 Claims, 7 Drawing Sheets

(56) References Cited

U.S. PATENT DOCUMENTS

| | | | |
|---|---|---|---|
| 4,473,927 A | 10/1984 | Miller | |
| 4,549,334 A | 10/1985 | Miller | |
| 4,566,236 A | 1/1986 | Pound | |
| 4,625,490 A | 12/1986 | Baslow | |
| 4,676,016 A | 6/1987 | Phillips et al. | |
| 4,782,883 A | 11/1988 | Braiotta | |
| 4,788,806 A * | 12/1988 | Sease | B44C 7/022 |
| | | | 160/395 |
| 4,805,330 A | 2/1989 | Bubemak | |
| 4,817,699 A | 4/1989 | Fein | |
| 4,835,824 A | 6/1989 | Durham et al. | |
| 4,986,332 A | 1/1991 | Lanuza | |
| 5,117,598 A | 6/1992 | Livingston et al. | |
| 6,027,091 A | 2/2000 | Johnson | |
| 6,431,251 B1 | 8/2002 | Yerusalim et al. | |
| 8,074,411 B1 * | 12/2011 | Anderson | E04F 13/005 |
| | | | 52/273 |
| 10,533,324 B2 * | 1/2020 | Baltz, Jr. | E04B 1/7076 |
| 2007/0283656 A1 * | 12/2007 | Anderson | E04F 19/061 |
| | | | 52/506.06 |
| 2010/0024333 A1 * | 2/2010 | Scherrer | E04F 13/005 |
| | | | 52/273 |
| 2010/0116445 A1 * | 5/2010 | Morris | E04B 9/303 |
| | | | 160/327 |
| 2015/0361662 A1 | 12/2015 | Reilly | |
| 2017/0268228 A1 | 9/2017 | Bergman | |
| 2020/0002953 A1 * | 1/2020 | Geis | E04F 13/005 |
| 2020/0277794 A1 * | 9/2020 | Kouijzer | E04F 13/005 |
| 2021/0002905 A1 * | 1/2021 | Nielsen | E04F 13/005 |

OTHER PUBLICATIONS

*WhisperWalls Innovative Acoustical Solutions*, WhisperWalls Design Support, 35 pages, [online], [retrieved from the Internet Feb. 4, 2020] <URL: http://www.whisperwalls.com/design/designList.php7room_condition=&system_thickness=&system_type=&edge_condition=&submit=%20%20Find%20Our%20Track>.

*Fabric Mounting Frame*, FabricMate, 11 pages, [online], [retrieved from the Internet Feb. 4, 2020] <URL: https://fabricmate.com/fabric-mounting-frame-track/>.

*AccuSnap™*, AccuTrack Systems®, 2 pages, [online], [retrieved from the Internet Feb. 4, 2020] <URL: https://www.accutracksystems.com/accusnap>.

*AccuHinge®*, AccuTrack Systems®, 2 pages, [online], [retrieved from the Internet Feb. 4, 2020] <URL: https://www.accutracksystems.com/accuhinge>.

*SnapLoc Drawings*, StretchWall, 4 pages, [online], [retrieved from the Internet Feb. 4, 2020] <URL: http://www.stretchwall.com/images/SnapLoc_Drawings.pdf.

International Search Report and Written Opinion for Application No. PCT/US2020/040155 dated Oct. 15, 2020.

\* cited by examiner

TRACK SYSTEM FOR ARCHITECTURAL STRETCH-FABRIC APPLICATIONS

CROSS REFERENCE TO RELATED APPLICATION

This application claims the benefit of U.S. Provisional Application No. 62/882,098, filed Aug. 2, 2019, which application is hereby incorporated by reference in its entirety.

TECHNOLOGICAL FIELD

An example embodiment relates generally to stretching fabrics, and more particularly, example embodiments relate to track systems for stretching fabrics.

BACKGROUND

Numerous track systems are used worldwide to stretch fabric tightly and evenly over walls and ceilings. The natural gap that is formed between the fabric and wall surface is generally filled with infill materials that provide acoustic treatment. However, various designs may either be costly and/or have performance deteriorate over time. Through applied effort, ingenuity, and innovation, many of these identified problems have been solved by developing solutions that are included in embodiments of the present disclosure, many examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

The new design described herein is manufactured as a one-piece, tucking system, but the re-configuring of the track profile, including the addition of an interior leg and support to a second area of tensioning between legs, along with a different approach to interlocking the fabric, retains the advantages of both styles of conventional designs while also virtually eliminating the major drawbacks of each.

In an example embodiment, a fabric housing for stretching fabric on walls or ceilings is provided. The fabric housing includes a first exterior wall and a second exterior wall. The fabric housing also includes a tensioning leg configured to tightly abut one of the first exterior wall or second exterior wall. The tensioning leg is configured to grip a fabric between the tensioning leg and the one of the first exterior wall or second exterior wall. The fabric housing further includes a pair of opposing jaws configured to secure the fabric. The pair of opposing jaws are disposed along one of the first exterior wall or the second exterior wall.

In some embodiments, the fabric housing also includes a protrusion extension configured to engage with a wall. In some embodiments, the tensioning leg is configured to removably engage with the same wall as the wall along which the pair of opposing jaws are disposed. In some embodiments, the tensioning leg is configured to removably engage with a different wall as the pair of opposing jaws are disposed. In some embodiments, the fabric housing also includes a shape mechanism configured to define the exterior shape of fabric positioned in the fabric housing. In some embodiments, the shape mechanism defines a square shape, a beveled shape, or a rounded shape.

In some embodiments, the tensioning leg is maintained in place by an interior leg. In such an embodiment, the interior leg is configured to be attached to the first exterior leg at one end and the second exterior leg at the other end. In some embodiments, the fabric housing defines a flexible interior area and a rigid interior area and the interior leg is configured to deflect more than the rigid interior area during positioning of the fabric. In some embodiments, the tensioning leg is configured to provide enough grip to the fabric as to restrict any movement. In some embodiments, the pair of opposing jaws include a locked position and an unlocked position. In such an embodiment, the pair of opposing jaws are interlocked in an instance the opposing jaws are in the locked position.

In another example embodiment, a method of installing fabric into a fabric housing is provided. The method includes inserting a fabric into a pair of opposing jaws configured to secure the fabric. The pair of opposing jaws are disposed along one of the first exterior wall or the second exterior wall. The method also includes securing the fabric with a tensioning leg configured to tightly abut one of the first exterior wall or second exterior wall in an instance in which the fabric has been inserted into the pair of opposing jaws. The tensioning leg is configured to grip a fabric between the tensioning leg and the one of the first exterior wall or second exterior wall.

In some embodiments, the method also includes causing the pair of opposing jaws to be interlocked. In some embodiments, the fabric is inserted into the pair of opposing jaws via an insertion tool. In some embodiments, the method also includes attaching the first exterior wall to a wall or ceiling surface. In some embodiments, the method also includes providing a second fabric housing adjacent to the fabric housing.

In some embodiments, the method also includes running the fabric over a shape mechanism. In such an embodiment, the shape mechanism is configured to define the exterior shape of fabric positioned in the fabric housing. In some embodiments, the tensioning leg is configured to provide enough grip to the fabric as to restrict any movement. In some embodiments, the method also includes disengaging the pair of opposing jaws in order to remove the fabric. In some embodiments, the fabric is installed into a first fabric housing at a first end and a second fabric housing at a second end.

In still another example embodiment, a method of manufacturing a fabric housing for stretching fabric on walls or ceilings is provided. The method includes the step of extruding a fabric housing. The fabric housing includes a first exterior wall, a second exterior wall, a tensioning leg, and a pair of opposing jaws. The tensioning leg is configured to tightly abut one of the first exterior wall or second exterior wall, and to grip a fabric between the tensioning leg and the one of the first exterior wall or second exterior wall. The pair of opposing jaws are configured to secure the fabric, and the pair of opposing jaws are disposed along one of the first exterior wall or the second exterior wall. The method also includes the step of providing an adhesive means or a mechanical means for attaching fabric housing to a ceiling or a wall surface.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
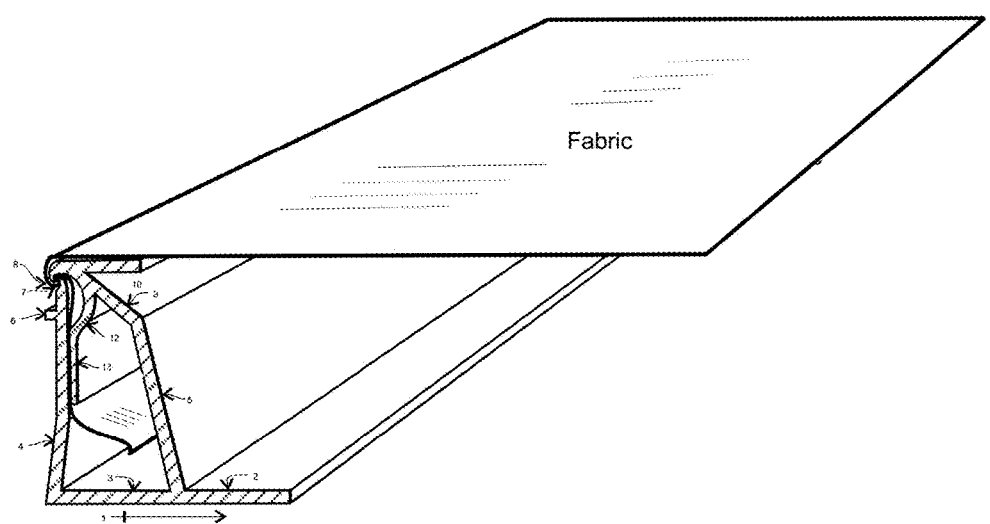
Figure 2:
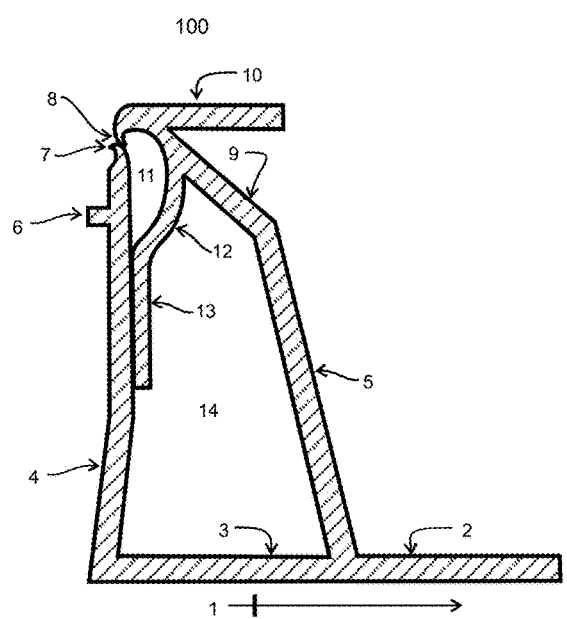
Figure 3:
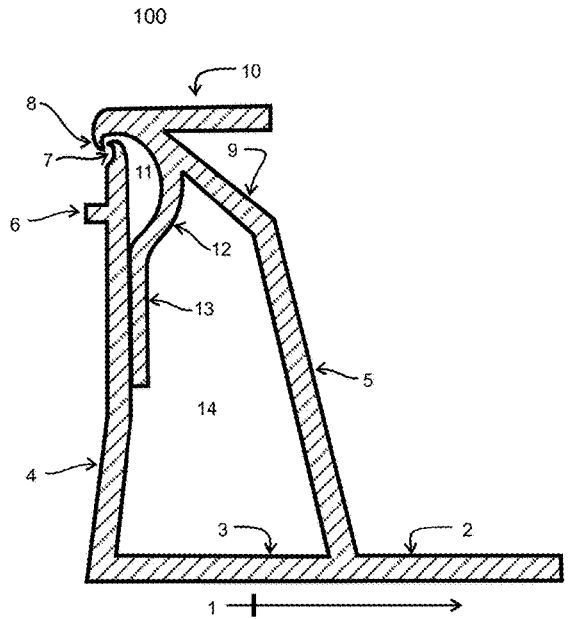
Figure 4:
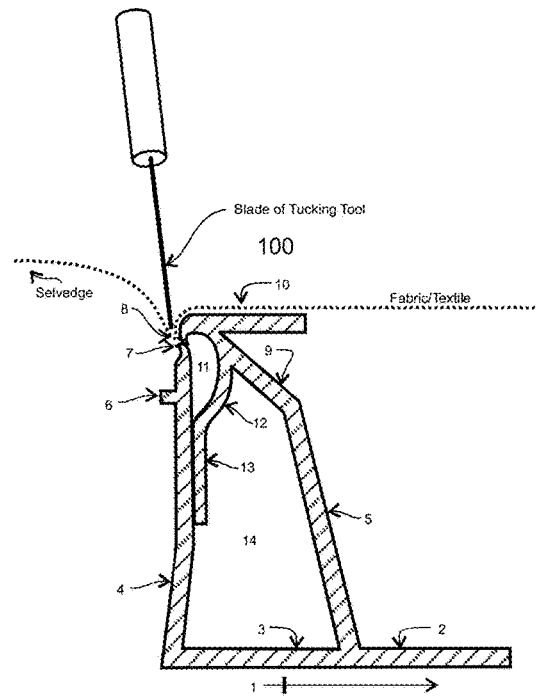
Figure 5:
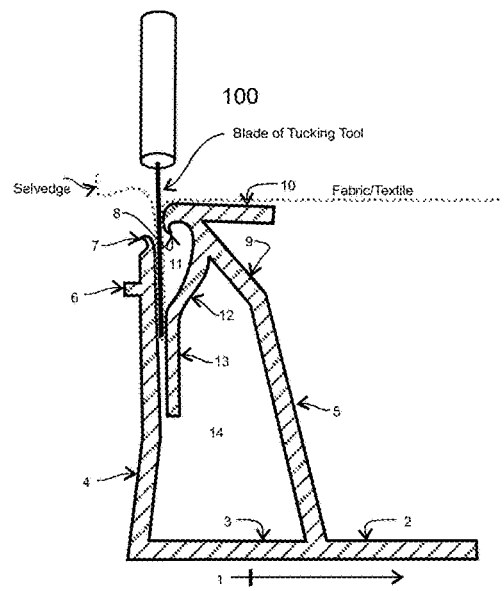
Figure 6:
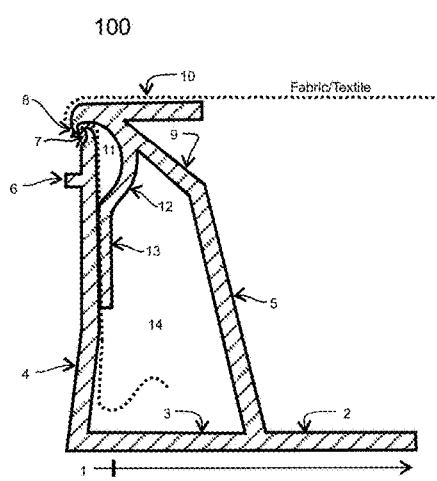
Figure 7A:
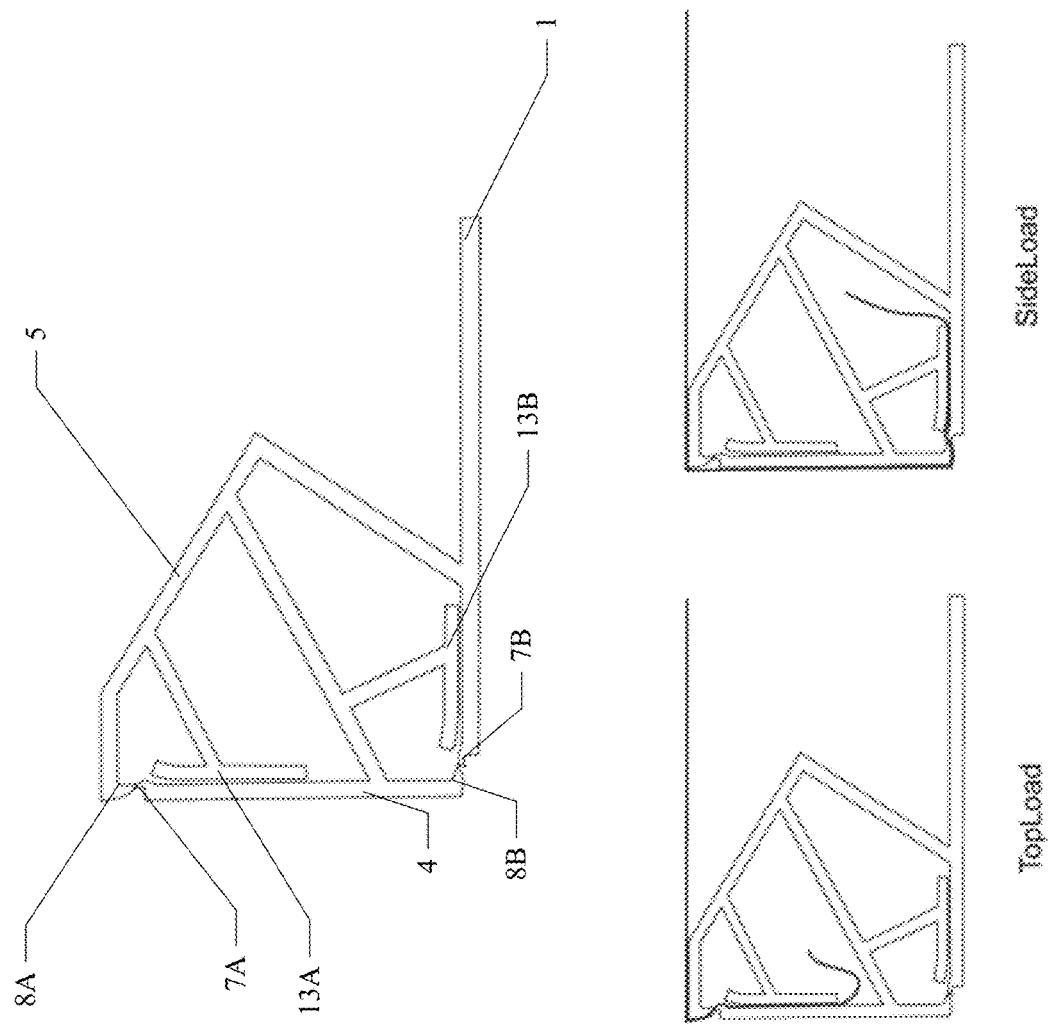
Figure 7B:
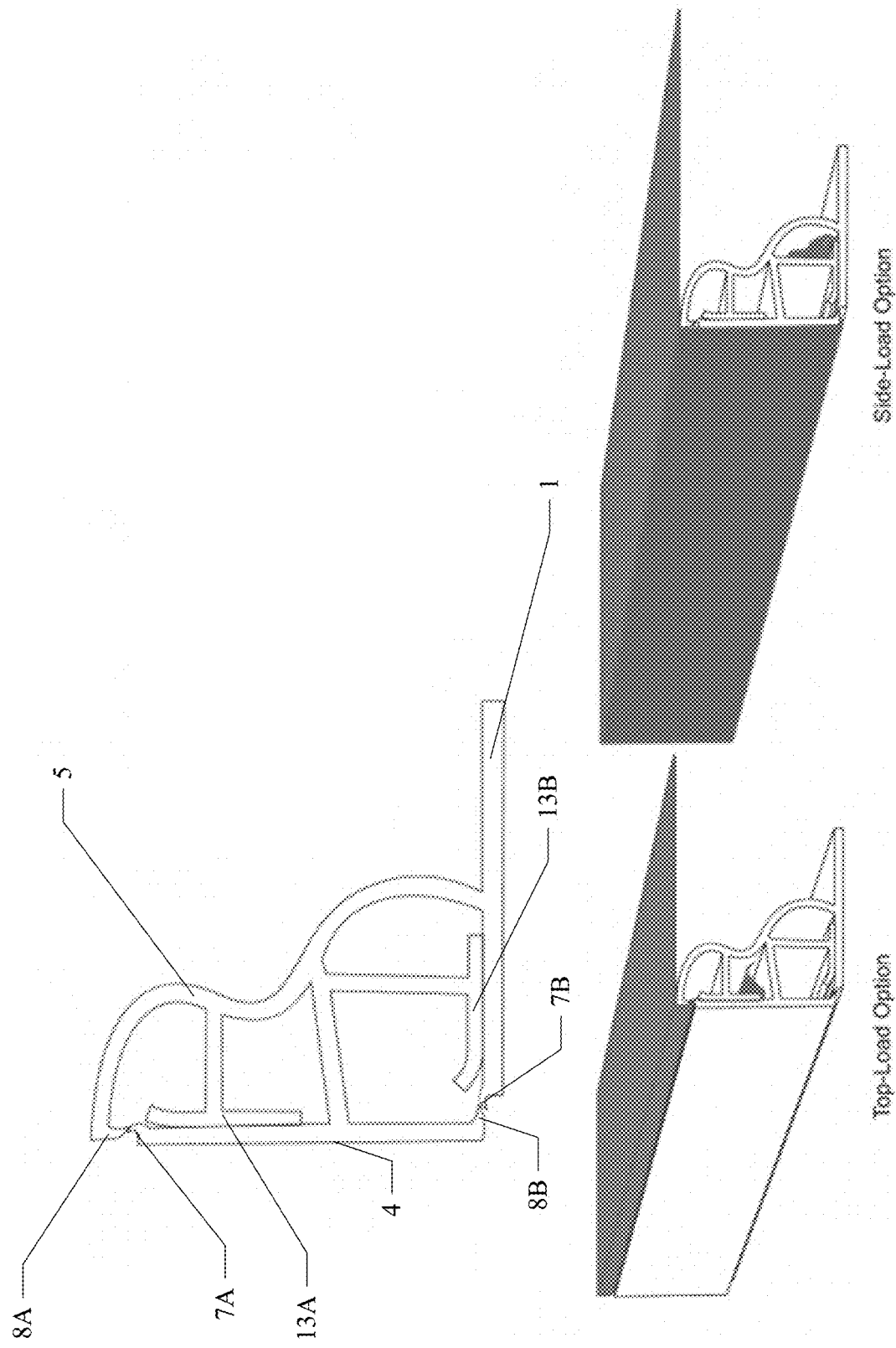
Figure 8A:
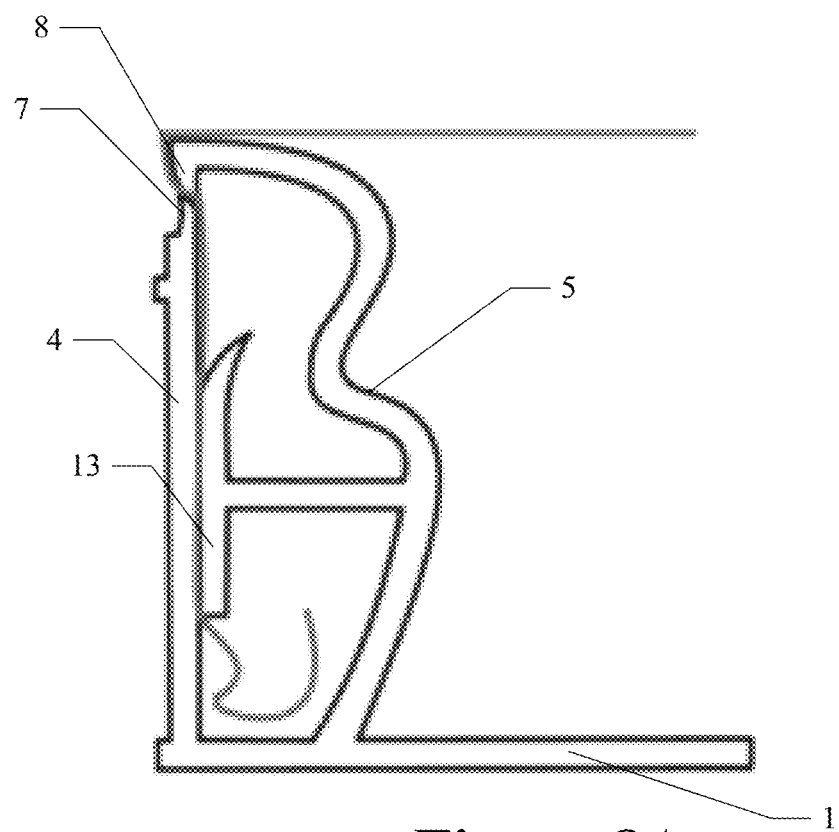
Figure 8B:
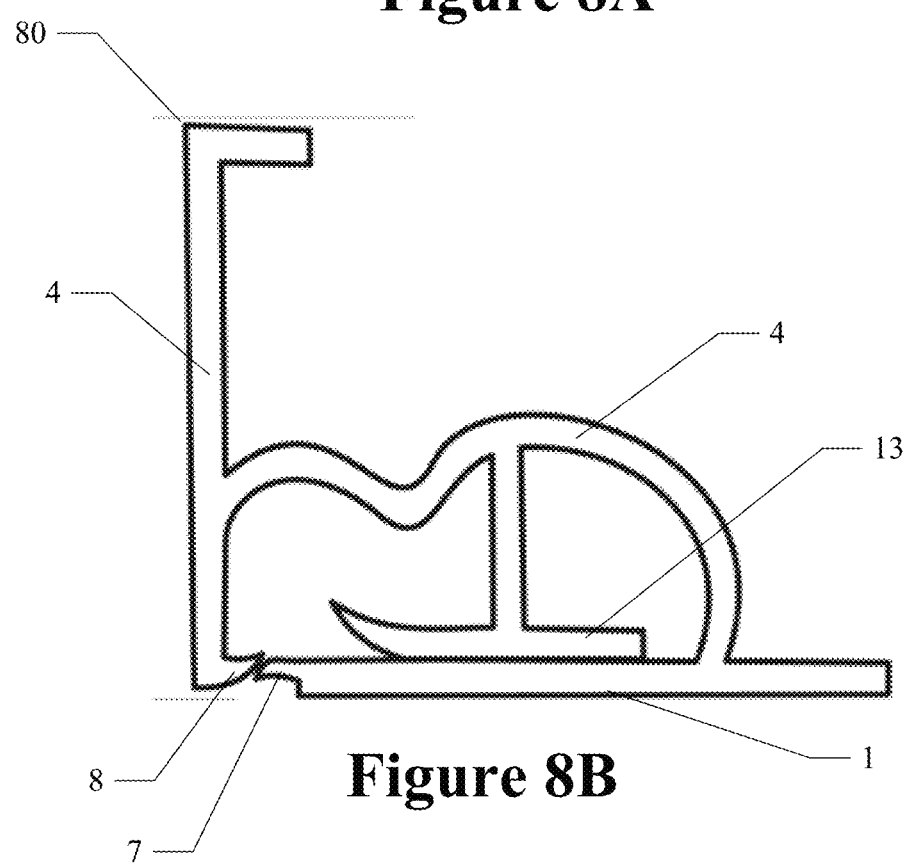
Figure 8C:
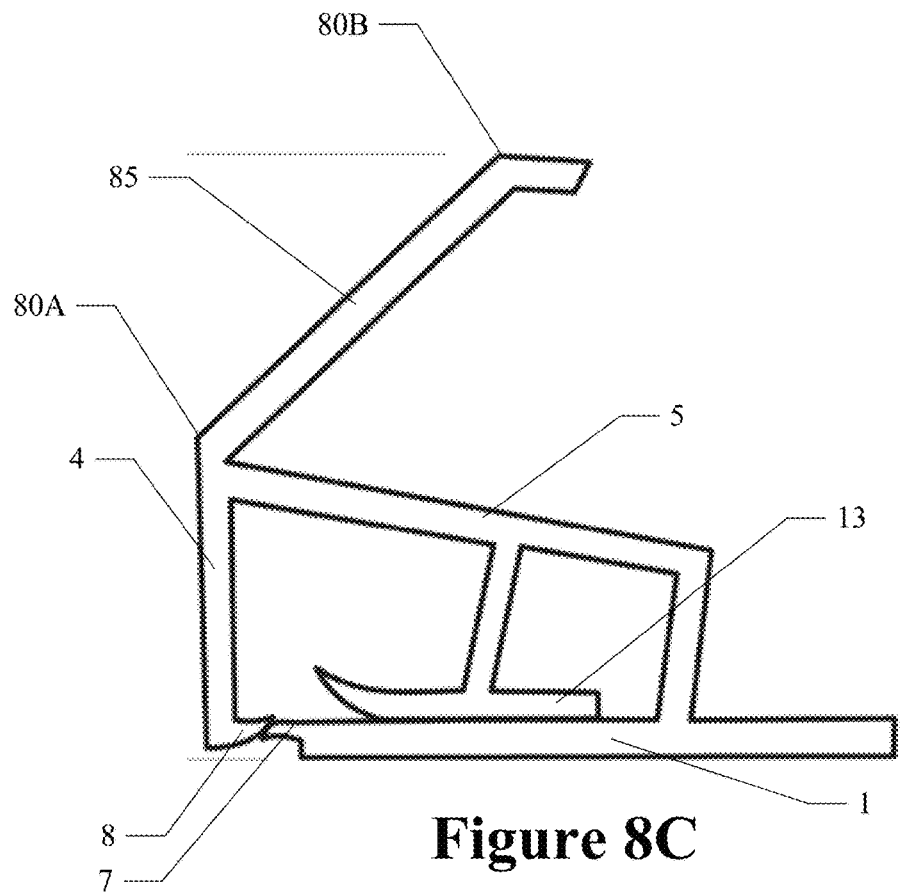
Figure 8D:
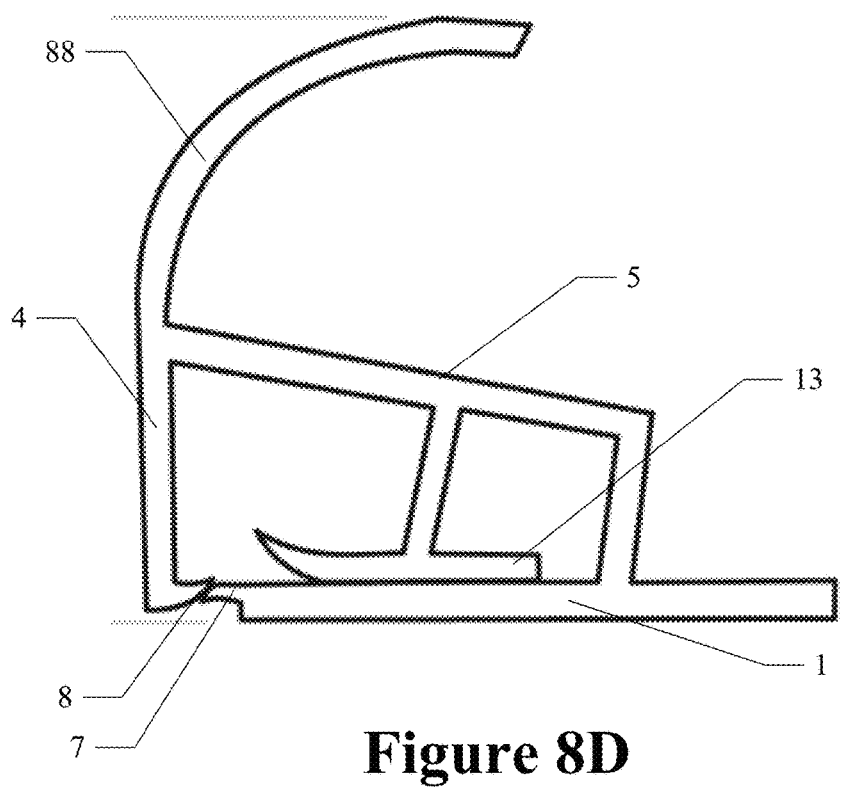
Figure 9:
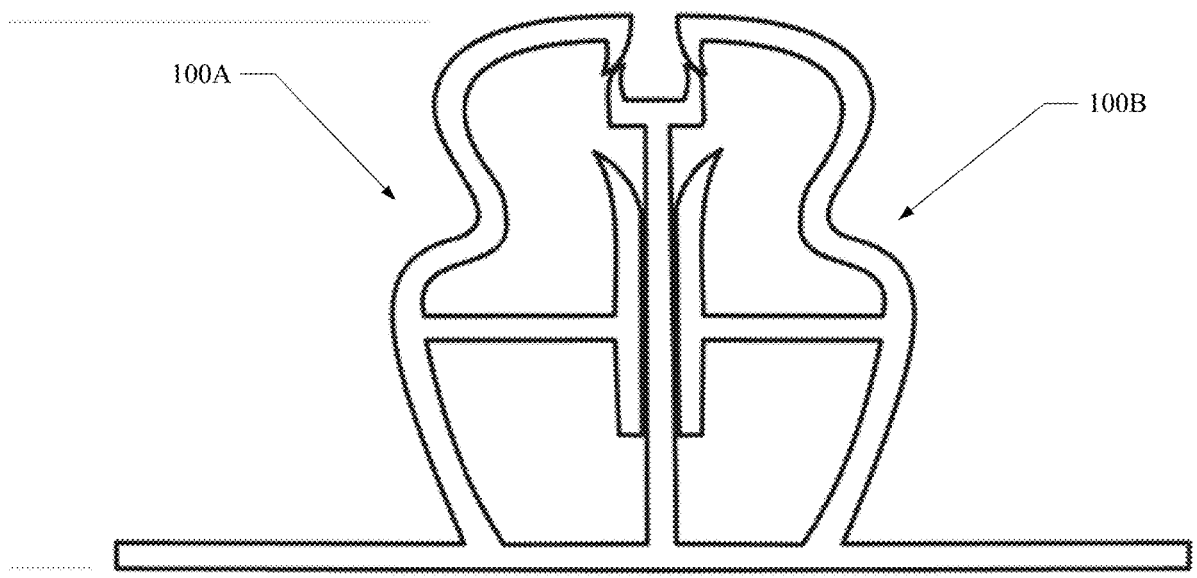

Having thus described certain example embodiments of the present disclosure in general terms, reference will hereinafter be made to the accompanying drawings, which are not necessarily drawn to scale, and wherein:

FIG. 1 illustrates a fabric housing as would be installed on a wall (or ceiling) surface with fabric inserted in accordance with an example embodiment;

FIG. 2 illustrates a cross section of an example fabric housing with the jaws not interlocked in accordance with an example embodiment;

FIG. 3 illustrates the same fabric housing of FIG. 2 with the jaws interlocked in accordance with an example embodiment;

FIG. 4 illustrates inserting fabric through the jaws into the fabric housing with a insertion tool in accordance with an example embodiment;

FIG. 5 illustrates inserting fabric through the tensioning leg of the fabric housing with a insertion tool in accordance with an example embodiment;

FIG. 6 illustrates the fabric fully installed in the fabric housing in accordance with an example embodiment; and FIGS. 7A and 7B illustrate example fabric housings configured to allow both side loading and top loading in various embodiments;

FIGS. 8A-8D illustrate various exterior shape designs in accordance with various embodiments including square (FIGS. 8A-8B), beveled (FIG. 8C), and rounded (FIG. 8D) designs; and FIG. 9 illustrates a fabric housing device configured to receive two adjacent fabrics in accordance with an example embodiment.

DETAILED DESCRIPTION

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art considering the present disclosure, the terms "substantially" and "approximately" indicate that the referenced element or associated description is accurate to within applicable engineering tolerances.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The terminology used herein is for describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of the stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so denied herein.

The present disclosure is to be considered as an exemplification of the various inventions and is not intended to limit the disclosure to the specific embodiments illustrated by the figures or description below.

Overview

Track systems may be used to stretch fabric on walls, often over acoustical treatment materials. Architects specify track systems routinely in very high-end properties primarily for acoustics and designers specify for an elegant, upholstered wall finish. Two basic styles of track are currently used. A "tuck" system, wherein fabric is simply forced between two tightly abutted planes, or walls, and a "locking" system, wherein fabric is snap-locked between two jaws. The "tuck" system is easier and less costly to manufacture (single material, static extrusion), installs much easier and faster and installers require little to no training. However, it is difficult for the tuck system to grip fabric as securely as desired.

The "locking" system is much more difficult to design and manufacture, including dual-material, co-extrusion with moving parts that must align perfectly for proper grip. Additionally, the locking system requires more training for installers to learn a variety of techniques and takes longer to install. Various embodiments of the present design allow for an easy to manufacture design and install, along with improved performance over the prior art.

In various embodiments, the fabric housing 100 may include a first exterior wall 1, a second exterior wall 4, and an exterior connecting wall 5 configured to stretch fabric, such as for use on a wall or ceiling. The fabric housing 100 may be formed out of a single material. For example, the fabric housing 100 may be extruded in the shapes shown herein or the like. In various embodiment, the first exterior wall 1, the second exterior wall 4, and the exterior connecting wall 5 may define a channel designed to receive fabric that is inserted between a pair of opposing jaws 7,8. Additionally, the channel also includes a tensioning leg 13 attached at one end to the exterior connecting wall 5 and configured to tightly abut one of the exterior walls at the other end. For example, as shown in FIGS. 1-3, the tensioning leg 13 may tightly abut the second exterior wall 4. As shown in FIG. 1, in various embodiments, a fabric may be inserted into the channel through opposing jaws 7,8 and in some cases then inserted between the tensioning leg 13 and one of the exterior legs (e.g., the second exterior wall 4 in FIG. 1).

In various embodiments, the fabric housing 100 may be based along an elongated flat base (e.g., exterior wall 1), which is attached to a wall or ceiling surface of a room by mechanical or adhesive means. As shown in FIGS. 1-3, the second exterior wall 4 and the exterior connecting wall 5 may extend upwards from this exterior wall 1 in roughly a parallel fashion, however angles or curves of varying degrees may be designed into either wall and in any direction to allow slight flexibility to the otherwise rigid structure, as well as to allow fastening tools, such as a stapler, to position the fastener closest to the center of the exterior wall 1. Additionally, in some embodiments, as discussed herein, the opposing jaws may be disposed on the first exterior wall 1 instead of the second exterior wall 4. Both walls 4 and 5 may also be or angled as depicted in wall FIGS. 1, 4, 5 and 7. If the second exterior wall 4 on the side of the fabric insertion point is angled, a protruding extension 6 may be included in order to stabilize second exterior wall 4 from being pushed away as pressure is put on a tab extension 10 in order to inter-engage the locking jaws 8 & 7. This extension would push against either an adjoining wall surface or another device, turned 180 degrees, forming an abutted seam. In various embodiments, fabric may be secured via a plurality of fabric housings configured at opposing ends of the fabric.

FIG. 2 shows an example fabric housing device 100 in its static state as manufactured. As shown, the exterior wall 1 runs flat, providing a firm base to carry the structure. In some embodiments, the exterior connecting wall 5 may be attached to the first exterior wall 1, such that the exterior wall 1 is divided into a first section 2 and a second section 3. In some embodiments, a portion of the first section 2 (e.g., half of the first section 2) may be accessible for a fastener to be applied as close to the center as practical. In some embodiments, the exterior connecting wall 5 may extend generally upward from approximately the mid-point of the first exterior wall 1 and may be used to position the opposing jaws 8, 7 and/or the tensioning legs 13. As shown and discussed herein, the exterior connecting wall 5 may be straight, curved or angled to allow for some minimal flexibility in strategic points, allowing for the teeth or jaws to engage when an installer (e.g. a person) pushes on them, while retaining the rigidity to the rest of the structure to assist gripping the fabric.

In some embodiments, the tensioning leg 13 may include a non-gripping portion 12 configured to not abut either of the exterior walls 1,4. In some embodiments, the non-gripping portion 12 of the tensioning leg 13 may from the inside of the cavity created by the first exterior wall 1, the second exterior wall 4, and the exterior connecting wall 5. In some embodiments, the non-gripping portion 12 may support and join the tensioning leg 13 with the exterior connecting wall 5. In various embodiments, the tensioning leg 13 may be configured to be moved such that fabric can be inserted between the tensioning leg 13 and the second exterior leg 4.

In some embodiments, the opposing jaws 7,8 may be disposed on one of the exterior walls (e.g., second exterior wall 4). In some embodiments, as shown in FIG. 2, the exterior connecting wall 5 may terminate (e.g., at an end or an edge) with an interlocking jaw 8 that will be touching the termination (e.g., a corresponding end or an edge) of the second exterior wall 4, which also ends with a interlocking jaw 7. In various embodiments, the two jaws 7, 8 may be angled or curved in opposite directions to each other, thus forming a locking grip when engaged (e.g., at respective terminating ends or edges of the legs or walls upon which they are formed). They will both be tensioned against each other but will be able to be separated by hand and/or a simple insertion tool (e.g., flat blade) that will force the edge and selvedge of fabric through the jaw area 7, 8 into the semi-flexible chamber 11 of the channel and then may be guided between tensioning leg 13 and one the of the exterior walls (e.g., second exterior wall 4).

In various embodiments, once fabric has been inserted and all selvedge is tucked away and hidden in the rigid chamber 14, fabric will be held in place by both the opposing jaws 7 & 8 and the tensioning leg 13. In some embodiments, as shown in FIGS. 1 and 3, the upper jaw 8 and the lower jaw 7 may be interlocked to provide even more security to the fabric grip by securely locking fabric in place between the jaws. The jaw 7,8 may be interlocked by inter-engaging the two jaws 7, 8 securely around fabric that becomes wrapped around the jaws and locked into place. As such, in an instance the jaws 7, 8 are interlocked together, each of the first exterior wall 1, the second exterior wall 4, and the exterior connecting wall 5 may be secured relative to one another, such that the entire fabric housing 100 is strengthened. The interlocking of the jaws 7,8 may also add rigidity as the fabric becomes tensioned tightly. This is a feature and benefit that was never available in previous designs of tension systems.

In some embodiments, as discussed below, the fabric housing 100 may also include a tab extension 10. In some embodiments, the tab extension 10 may come off the upper termination point of the exterior connecting wall 5. In various embodiments, the tab extension 10 may provide an area to which an installer may apply double-faced tape in order to position the fabric weave or pattern before inserting the fabric into the device. As discussed in reference to FIG. 9A-9D, the tab extension may also be angled upwardly or rounded upwardly, creating a variety of edge detail designs to the perimeters of each fabric panel.

FIG. 4 depicts the process of applying fabric into this device in accordance with an example embodiment. In some embodiments, the blade of an insertion tool (e.g., a flat, blunt metal piece like a putty knife or a rounded blade similar to a pizza cutter) is placed over the fabric with a small amount of fabric selvedge on the edge. In some embodiments, the insertion tool may be used to pry the jaws 7, 8 slightly apart and forces the fabric into the semi-flexible chamber 11. Additionally, as shown in FIG. 5, the insertion tool may then be inserted further into semi-flexible chamber 11, such that the fabric is inserted between the tensioning leg 13 and an exterior wall (e.g. second exterior wall 4). After the entire fabric selvedge is guided through the tensioning leg 13, the insertion tool may be removed. FIG. 6 illustrates the fabric fully inserted into a fabric housing 100 of an example embodiment.

FIG. 7A illustrates an additional embodiment of the fabric housing, wherein the fabric housing 100 is configured for both top loading (e.g., the jaw 7A, 8A along the second exterior wall 4) or side load (e.g., the jaws 7B, 8B along the first exterior wall 1). In some embodiments, to allow for two sets of jaws, two tensioning legs 13A, 13B may also be provided. When choosing the "top-load" position, the fabric may be inserted through jaws 7A. 8A and tensioning leg 13A to grip the fabric like the process discussed in FIG. 1.

Additionally, the side-loading position operates similarly, such that the fabric is inserted into the jaws 7B, 8B and the tensioning leg 13B. In the side-loading option, the fabric may be flush with the second exterior wall 4 (e.g., side loading may be used in an instance the fabric housing 100 may be partially exposed when installed). For example, in an instance the fabric panel edge ends mid-wall, the fabric housing 100 may be visible when using the top load position. FIG. 7B illustrates an additional example embodiment that includes a curved exterior connecting wall 5.

Example Shapes of Fabric Housings

In various embodiments, the fabric housing 100 may have various profiles and/or shapes. In some embodiments, the depth of the fabric housing (e.g., height of the second exterior wall 4) may vary based on the acoustical treatments installed, as the fabric may vary greatly in depth and thickness. In some embodiments, the depth of the fabric housing may be from approximately ¼ inches to 3 inches. In some embodiments, the depth of the fabric housing may be from ½ inches to 2 inches. In some embodiments, the depth of the fabric housing may be from approximately ¾ inches to 1.5 inches. In some embodiments, the depth of the fabric housing may be approximately 1 inch. Additionally, the profiles of the extruded fabric housing may vary to provide different edge details to the panel sections created. As discussed herein, each fabric housing may have a different shape mechanism to provide such edge details. In various embodiments, the edges may include a square, round, or bevel design with varying amounts of roundness or angle.

FIGS. 8A and 8B illustrate a square edge design of example embodiments. FIG. 8A illustrates a top load square fabric housing, such that the jaws 7, 8 are disposed along the second exterior wall 4. As shown, the exterior connecting wall 5 may have a curved shape to assist the flexibility of the exterior connecting wall 5 relative to the jaws 7, 8. As shown in FIGS. 8A and 8B, the shape mechanism includes a top edge 80 has an approximately right angle, such that the fabric, when inserted forms a right angle when stretched across the top edge 80. FIG. 8B illustrates a side loading square fabric housing 100 that operates in the same way that the top load square fabric housing, except the fabric stretches along the entirety of the second exterior wall 4 before engaging with the top edge 80.

FIG. 8C illustrates a beveled fabric housing configured with a plurality of top edges 80A, 80B, such that the fabric stretches across the shape mechanism, which includes the top edges 80A, 80B, to give a beveled appearance. As shown, the beveled square housing may have varying angles and/or lengths. For example, the leg 85 between the top edges 80A, 80B may be adjusted, as well as the angle of the legs at each of the top edges 80A, 80B. In some embodiments, the bevel or rounded edge length (rounded housing discussed below in reference to FIG. 8D) may be based on the desired aesthetics of the fabric. For example, the bevel and/or rounded edge may be approximately ½ inches to 1 inch. Additionally, the angle of the bevel and/or rounded edge may be approximately 30 degrees to 45 degrees. Various other lengths and/or angles may also be used in various embodiments.

Like FIG. 8C, FIG. 8D illustrates another design of the fabric housing 100 to adjust the appearance. FIG. 8D illustrates a rounded fabric housing. As shown, the second exterior leg 4 may be extended above the location at which the exterior connecting wall 5 is attached. In such an embodiment, the second exterior leg 4 may have a round edge 88 that forms the shape mechanism and may be configured for the fabric to be stretched across, such that the fabric has a rounded appearance. In various embodiments, the radius of rounded edge may be varied to accommodate different amounts of rounding.

FIG. 9 illustrate an example embodiment in a fabric housing device may have a plurality of fabric housings 100A, 100B, such that two fabrics may be stretched and held side-by-side. For example, the fabric housing device shown in FIG. 9 may be used in the middle of a wall to allow two fabrics to be used without a gap in the fabric (e.g., the two fabrics would abut one another). In various embodiments, the fabric housing device of FIG. 9 may be a singular extruded piece. In some embodiments, the individual fabric housings (e.g., FIGS. 8A-8C) may be configured to be installed adjacent to another fabric housing and operate similarly to the fabric housing device of FIG. 9.

Although the present invention has been illustrated and described herein with reference to preferred embodiments and specific examples thereof, it will be clear to those of ordinary skill in the art that other embodiments and examples may perform similar functions and/or achieve like results. All such equivalent embodiments and examples are within the spirit and scope of the present invention, are contemplated thereby, and are intended to be covered by the following claims.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A fabric housing for stretching fabric on walls or ceilings, the fabric housing comprising:
   a first exterior wall;
   a second exterior wall;
   a tensioning leg configured to tightly abut one of the first exterior wall or second exterior wall, the tensioning leg being configured to grip a fabric between the tensioning leg and the one of the first exterior wall or second exterior wall; and
   a pair of opposing jaws separate from the tensioning leg and configured to secure the fabric, a first of the pair of opposing jaws being disposed on an edge of a first portion of the second exterior wall, a second of the pair of opposing laws being disposed on an edge of a second portion of a wall of the fabric housing other than the second exterior wall, the edge of the second portion containing the first of the pair of opposing jaws being perpendicular to the edge of the first portion that contains the second of the pair of opposing jaws.

2. The fabric housing of claim 1, further comprising a protrusion extension configured to engage with a wall, wherein the protrusion extension contains the second of the pair of opposing laws.

3. The fabric housing of claim 1, wherein the tensioning leg is configured to removably engage with the same wall as the wall along which the pair of opposing jaws are disposed.

4. The fabric housing of claim 1, wherein the tensioning leg is configured to removably engage with a different wall as the pair of opposing jaws are disposed.

5. The fabric housing of claim 1, further comprising a shape mechanism configured to define the exterior shape of fabric positioned in the fabric housing.

6. The fabric housing of claim 5, wherein the shape mechanism defines a square shape, a beveled shape, or a rounded shape.

7. The fabric housing of claim 1, wherein the tensioning leg is maintained in place by an interior leg, the interior leg being configured to be attached to the first exterior wall at one end and the second exterior wall at the other end.

8. The fabric housing of claim 7, wherein:
the fabric housing defines a flexible interior area and a rigid interior area, and
the interior leg is configured to deflect more than the rigid interior area during positioning of the fabric.

9. The fabric housing of claim 1, wherein the tensioning leg is configured to provide enough grip to the fabric as to restrict any movement.

10. The fabric housing of claim 1, wherein:
the pair of opposing jaws comprise a locked position and an unlocked position, and
the pair of opposing jaws are interlocked in an instance the opposing jaws are in the locked position.

11. A method of installing fabric into a fabric housing, the method comprising:
providing a fabric housing that comprises a first exterior wall, a second exterior wall, a tensioning leg configured to tightly abut one of the first exterior wall or second exterior wall, and a first jaw of a pair of opposing jaws disposed on an edge of a first portion of the second exterior wall, and a second jaw of the pair of opposing jaws disposed on an edge of a second portion located on a wall of the fabric housing, the edge of the second portion being perpendicular to the edge of the first portion, the pair of opposing jaws being separate from the tensioning leg and configured to secure the fabric;
inserting a fabric into the pair of opposing jaws configured to secure the fabric; and
in an instance in which the fabric has been inserted into the pair of opposing jaws, securing the fabric with the tensioning leg configured to tightly abut one of the first exterior wall or second exterior wall, the tensioning leg being configured to grip a fabric between the tensioning leg and the one of the first exterior wall or second exterior wall.

12. The method of claim 11, further comprising one or more of:
causing the pair of opposing jaws to be interlocked, or
disengaging the pair of opposing jaws in order to remove the fabric.

13. The method of claim 11, wherein the fabric is inserted into the pair of opposing jaws via an insertion tool.

14. The method of claim 11, further comprising attaching the first exterior wall to a wall or ceiling surface.

15. The method of claim 11, further comprising providing a second fabric housing adjacent to the fabric housing.

16. The method of claim 11, further comprising running the fabric over a shape mechanism, wherein the shape mechanism configured to define the exterior shape of fabric positioned in the fabric housing.

17. The method of claim 11, wherein either;
the tensioning leg is configured to provide enough grip to the fabric as to restrict any movement; or
the fabric is installed into a first fabric housing at a first end and a second fabric housing at a second end.

18. A method of manufacturing a fabric housing for stretching fabric on walls or ceilings, the method comprising the step of:
(a) extruding a fabric housing, the fabric housing comprising:
a first exterior wall;
a second exterior wall;
a tensioning leg configured to tightly abut one of the first exterior wall or second exterior wall, the tensioning leg being configured to grip a fabric between the tensioning leg and the one of the first exterior wall or second exterior wall; and
a pair of opposing jaws separate from the tensioning leg and configured to secure the fabric, a first law of the pair of opposing jaws being disposed on an edge of a first portion of the second exterior wall, a second jaw of the pair of opposing jaws being disposed on an edge of a second portion of a wall of the fabric housing, the edge of the second portion being perpendicular to the edge of the first portion; and
(b) providing an adhesive means or a mechanical means for attaching fabric housing to a ceiling or a wall surface.

19. The fabric housing of claim 1, wherein:
the second portion is a segment of the first exterior wall, and
the second of the pair of opposing jaws is disposed on the segment of the first exterior wall.

20. A fabric housing for stretching fabric on walls or ceilings, the fabric housing comprising:
a first exterior wall;
a second exterior wall;
a tensioning leg configured to tightly abut one of the first exterior wall or second exterior wall, the tensioning leg being configured to grip a fabric between the tensioning leg and the one of the first exterior wall or second exterior wall; and
a pair of opposing jaws configured to secure the fabric, the pair of opposing jaws being disposed along one of the first exterior wall or the second exterior wall, the pair of opposing jaws being separate from the tensioning leg,
wherein the tensioning leg is configured to removably engage with the same wall as the wall along which the pair of opposing jaws are disposed.

21. A fabric housing for stretching fabric on walls or ceilings, the fabric housing comprising:
a first exterior wall;
a second exterior wall;
a tensioning leg configured to tightly abut one of the first exterior wall or second exterior wall, the tensioning leg being configured to grip a fabric between the tensioning leg and the one of the first exterior wall or second exterior wall; and
a pair of opposing jaws configured to secure the fabric, the pair of opposing jaws being disposed along one of the first exterior wall or the second exterior wall, the pair of opposing jaws being separate from the tensioning leg, wherein the tensioning leg is maintained in place by an interior leg, the interior leg being configured to be attached to the first exterior wall at one end and the second exterior wall at the other end.

\* \* \* \* \*

UNITED STATES PATENT AND TRADEMARK OFFICE
CERTIFICATE OF CORRECTION

| | |
|---|---|
| PATENT NO. | : 11,624,190 B2 |
| APPLICATION NO. | : 16/731884 |
| DATED | : April 11, 2023 |
| INVENTOR(S) | : John Bubernak |

It is certified that error appears in the above-identified patent and that said Letters Patent is hereby corrected as shown below:

In the Claims

At Claim 1, Column 8, Line 64, delete "laws" and insert --jaws--, therefor.

At Claim 2, Column 9, Line 6, delete "laws" and insert --jaws--, therefor.

At Claim 18, Column 10, Line 25, delete "law" and insert --jaw--, therefor.

Signed and Sealed this
Tenth Day of October, 2023

*Katherine Kelly Vidal*

Katherine Kelly Vidal
*Director of the United States Patent and Trademark Office*